Patented Sept. 10, 1940

2,214,206

UNITED STATES PATENT OFFICE 2,214,206

METHOD OF SEPARATING SOLUBLE ORES BY HINDERED SETTLING SEPARATION

John P. Rasor, Boron, Calif., assignor to Pacific Coast Borax Company, a corporation of Nevada No Drawing. Application October 15, 1938, Serial No. 235,244

3 Claims. (Cl. 209—155)

This invention relates generally to hindered settling separation of substances having different specific gravity such as, for example, the mineral constituents of ores. Hindered settling separation is a process in which the material to be separated is delivered into an upwardly moving stream which acts to carry upward the particles of lighter specific gravity and allows the downward movement against the stream of the particles of heavier specific gravity.

Hindered settling separation has been used for separating coal and gangue and various grades of coal, and has been used in separating other substances where the substances to be separated are insoluble in water or the liquid of the bath. In all hindered settling separation processes with which I am familiar, the substances to be separated therefrom are insoluble in the bath and the bath is comprised of a heavy liquid, either a solution or suspension of some substance other than one of the substances to be separated.

As distinguished from ordinary processes of hindered settling separation the present invention relates to the separation of substances where one or more of the substances to be separated is soluble in water or in the bath used, and it is a primary object of this invention to provide a process of hindered settling separation for the separation of substances were one or more of the substances to be separated is soluble in water.

It is also an object of this invention to provide a process of hindered settling separation which utilizes a bath formed of water and one or more of the soluble substances to be separated.

It is a particular object of this invention to provide a process of hindered settling separation which is particularly adapted for the separation of KCl and NaCl from potash ore in order to obtain relatively large particles of KCl. In this connection froth flotation processes and other methods of separation are not adaptable for use on potash ore to achieve the separation of the KCl in relatively large particles which particles of KCl in the product are desirable in order to produce a product which is suitable for agricultural and other uses.

These and other objects will be apparent from the following description of the process.

The process of this invention comprises generally the provision of a water solution of one or both of the substances to be separated and a suspension in this solution of fine particles of one or more or both of the substances to be separated. This solution and suspension is used as the bath for the separation and is circulated through a suitable container in such a manner as to keep the fine particles in suspension.

The ore composed of the substances to be separated is introduced into any suitable container in which the bath is caused to flow in a rising current. The ore so introduced into the bath is in relatively coarse ground condition and the substance having the lower specific gravity flows from the top with the rising bath together with a certain percentage of the matter in suspension, while the substance or substances having the greater specific gravity move downwardly against the rising bath and are removed at or near the bottom of the container. The mixture flowing off the top with the bath may be subsequently separated from the fine particles held in suspension by ordinary methods of separation depending upon different size particles.

More particularly describing the invention the process is designed principally for the separation of KCl from NaCl of potash ore. In carrying out the process a suitable container is provided for holding the bath and suitable provision is made for the circulation of the bath liquid upwardly through this container and the restoration of the bath liquid to its original condition. Suitable provision is also made for allowing the bath after moving upwardly in the container to be removed with the lighter substances and for removing the heavier substances from the lower portion of the container.

A saturated solution of the potash ore is made up, and finely ground ore is subsequently added thereto so that the resulting liquid and solid mixture forming the bath is of sufficient density to permit upward movement of the lighter relatively large size particles of the ore (KCl, specific gravity—1.99) with the bath and downward movement of the heavier relatively large particles of the ore (NaCl, specific gravity—2.15) against the upwardly moving bath, the exact density of the bath depending in some respect on the velocity of the upwardly moving bath and the nature of the ore being separated. The coarse ground ore introduced into the container consists of ore ground to −12+14 mesh.

The relatively large lighter particles of KCl which are discharged with the bath are separated from the solution and the fine particles of ore held in suspension therein by screen classifiers or by any other ordinary type of classifier which depends for its function upon the difference in size of the substances to be separated.

The relatively large heavy particles of NaCl are removed from the bath near the bottom of the bath container. Suitable provision is made for circulating the bath liquid and for maintaining its original consistency.

As an example, a saturated solution of ore was formed and finely ground ore added until there was one part ore to four parts saturated solution by weight. This mixture of solution and solids was used as the bath, and potash ore having the following composition was added:

| | Per cent |
|---|---|
| KCl | 45.57 |
| Water insolubles | 1.00 |
| NaCl | 53.43 |

The potash ore was grounded to −12+14 mesh and introduced into the bath. After the KCl which had been discharged with the bath had been concentrated by some ordinary separation means depending upon difference in size of the substances to be separated, the concentrates showed 75.78% KCl. The tailings contained 32.91% KCl.

While in the example it has been pointed out that the solution is made up from a bath of the substances to be separated, it is within the scope of the invention to provide a solution of either one of the substances to be separated and to use either one of the substances as finely ground material held in suspension in the solution to form the bath.

I claim as my invention:

1. The process of separating the KCl from NaCl of potash ore which comprises: providing a bath comprising four parts saturated solution of KCl and NaCl, adding thereto one part of finely divided particles of KCl and NaCl in substantial amount sufficient to increase the density of the bath; causing the bath to flow upwardly; introducing the ore ground to approximately −12+14 mesh to the bath; the upwardly moving bath of increased density effecting separation of the lighter from the heavier substances and removing the KCl particles of −12+14 mesh by permitting said particles to discharge from the top of the bath with a portion of the bath.

2. The process of separating the KCl from NaCl of potash ore which comprises: providing a bath comprising four parts saturated solution of KCl and NaCl, adding thereto one part of finely divided particles of KCl and NaCl in substantial amount sufficent to increase the density of the bath; causing the bath to flow upwardly; introducing the ore ground to approximately −12+14 mesh to the bath; the upwardly moving bath of increased density effecting separation of the lighter from the heavier substances and removing the KCl particles of −12+14 mesh by permitting said particles to discharge from the top of the bath with a portion of the bath and separating said removed particles of KCl from the bath by classifying the solids according to size and permitting the liquid and suspended particles of the bath to drain therefrom.

3. The process of separating KCl from NaCl of potash ore which comprises: providing a bath comprising a saturated solution of KCl and NaCl, adding thereto finely divided particles of KCl and NaCl in substantial amount sufficient to increase the density of the bath, causing the bath to flow upwardly; introducing the ore ground to approximately −12+14 mesh to the bath, the upwardly moving bath of increased density effecting separation of the lighter from the heavier substances; and removing the KCl particles of −12+14 mesh by permitting said particles to discharge from the top of the bath with a portion of the bath.

JOHN P. RASOR.